F. DOYLE.
AUTOMATIC FEED LUBRICATOR.
APPLICATION FILED JULY 3, 1913.
1,105,126.
Patented July 28, 1914.
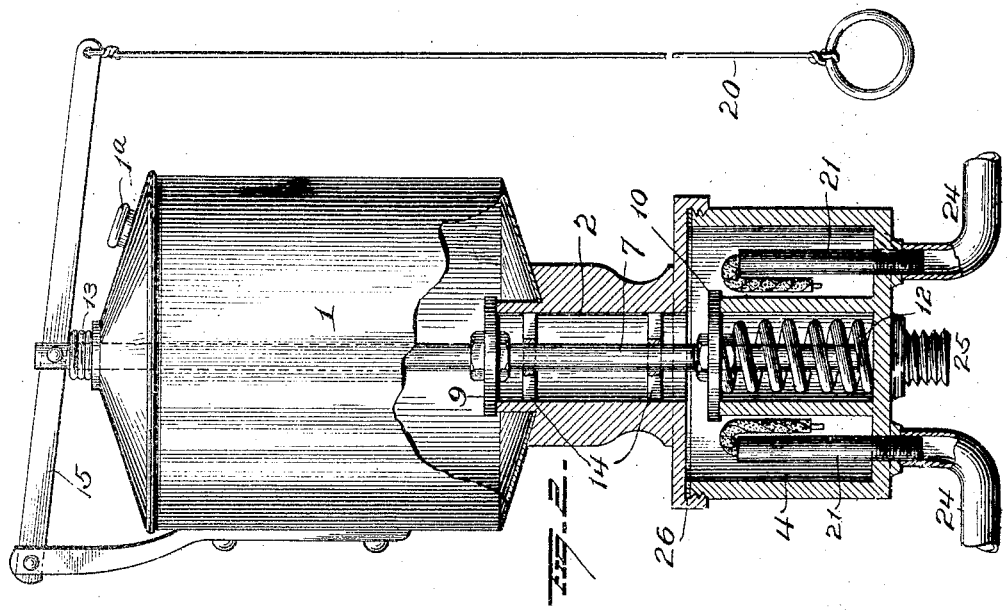
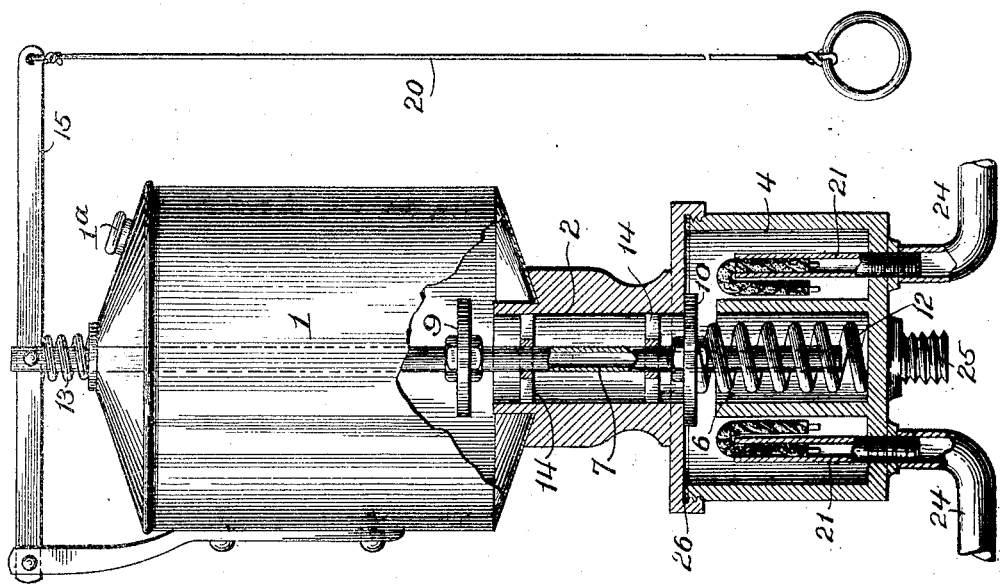
WITNESSES
INVENTOR
F. Doyle
By H. A. Seymour
Attorney

UNITED STATES PATENT OFFICE.

FREMONT DOYLE, OF MARION, INDIANA.

AUTOMATIC-FEED LUBRICATOR.

1,105,126. Specification of Letters Patent. Patented July 28, 1914.

Application filed July 3, 1913. Serial No. 777,315.

*To all whom it may concern:*

Be it known that I, FREMONT DOYLE, of Marion, in the county of Grant and State of Indiana, have invented certain new and useful Improvements in Automatic-Feed Lubricators; and I do hereby declare the following to be a full, clear, and exact description of the invention, such as will enable others skilled in the art to which it appertains to make and use the same.

My invention relates to an improvement in automatic feed lubricators for use on machinery indiscriminately, and is designed for supplying a fixed amount of lubricant to a plurality of bearings on the same or different machines or apparatus within a given time, and it consists in the parts and combinations of parts as will be more fully explained and pointed out in the claims.

In the accompanying drawings, Figure 1 is a view partly in section and partly in elevation showing the parts in their normal position, and Fig. 2 is a similar view showing the position of the parts while the oil is passing from the measuring chamber to the oil cup.

1 represents a supply tank or reservoir provided with a filling opening normally closed by a screw cap 1ª, and mounted on the upper end of the stem 2, the latter being hollow and constituting a measuring chamber. This chamber is open throughout its length and communicates at its upper open end with the reservoir 1, and at is lower end with the oil cup 4. The base or bottom of the stem 2 is enlarged to form the top of the oil cup, and is provided with a threaded peripheral flange for its attachment to said cup, leakage being prevented by a leather or other suitable packing ring 26 interposed between the top of the oil cup and the base of the stem or measuring chamber 2.

The oil cup, or distributing chamber 4 is preferably cylindrical in form, and is provided centrally with an integral cylindrical sleeve 6, concentric with the outer wall of the oil cup, and open at its top only. This sleeve forms a central compartment which is located immediately under and in line with the measuring chamber in stem 2, and forms a housing for the spring 12 and for the lower open end of the hollow rod 7. This hollow rod, open at both ends, passes through the reservoir and measuring chamber and into the sleeve 6, and terminates within the latter above the bottom of the oil cup 4, and is connected at its upper end, at a point above the reservoir, with a lever 15, pivoted at one end to the bracket 10 secured to the reservoir 1, and provided at its free end with a depending rod to chain 20, by pulling down on which, the rod 7, will be forced downwardly, as hereinafter explained to discharge the oil in the measuring chamber into the oil cup. The rod 7 is located centrally with relation to the measuring chamber, and is guided in its movements by the spiders on arms 14 integral with the stem 2. This rod 7 carries the disk valves 9 and 10, the former of which is located in the oil reservoir 1, immediately above the measuring chamber, and the latter in the oil cup 4 intermediate the lower end of the measuring chamber and the top of sleeve 6, and is adapted to move from its position shown in Fig. 1, to that shown in Fig. 2.

Located within the compartment formed by the sleeve 6, and bearing at one end against the bottom of said compartment, and at its upper end against the valve 10, is the heavy spring 12, which latter tends to hold the rod 7 in its elevated position, in which position the valve 10 forms a closure for the measuring chamber at the bottom. When the valve 10 is closing the measuring chamber, the valve 9 rests in a plane above the top of the measuring chamber, thus permitting the oil in the reservoir 1 to pass into the measuring chamber and fill the same, so that when the rod 7 is forced downwardly by pulling down on the rod or chain 20, the oil in the measuring chamber will gravitate into the oil cup 4. The valves 9 and 10, are so located with relation to each other and to the upper end of sleeve 6, and the top of the measuring chamber, that, when valve 10 is in engagement with the top of sleeve 6 valve 9 will form a closure for the top of the measuring chamber, thus cutting off the latter from the reservoir, and permitting only the oil in the measuring chamber, to pass into the oil cup. When the valve 9 is in contact with the upper open end of the measuring chamber, valve 10 will be in contact with the top of the sleeve and close the latter against the entrance of any oil into the same. The valve 10 is however of such size, that, if it be lowered part way, and not into contact with the sleeve, it will act as a deflector for the oil and discharge it into the oil cup outside of the sleeve 6. Spring 12, is assisted in elevating the rod 7 by the spring 13, embracing the rod 7 above the reservoir 1, and bearing at its lower end against the latter and at its upper end against lever 15.

From the foregoing it will be seen that the springs 12 and 13 hold the rod 7 elevated with the valve 10 closing the lower end of the measuring chamber, and the valve 9 elevated, so as to permit of the free passage of oil from reservoir 1, into the measuring chamber, thus filling the latter. By pulling down on rod or chain 20, the hollow rod 7 will be forced downwardly, moving valve 9 against the top of the measuring chamber and closing communication between the latter and the reservoir and moving valve 10 away from the lower end of the measuring chamber, and permitting the oil in the latter to pass into the oil cup. The rod 7 is hollow throughout its length, and in addition to operating the valves, as previously described, also supplies air from the outside to the oil cup, which in a closed or otherwise air tight cup, is essential to the proper feed of oil from the latter. The lower open end of the rod 7 terminates within the sleeve, hence the latter in addition to forming a housing for the spring, provides for the free passage of the air from the lower end of rod into the oil cup above the oil in the latter.

Secured to and passing through the bottom of the oil cup is a series of short tubes 21, preferably one for each bearing or part of the machine or apparatus to be lubricated. These tubes which are open at both ends, preferably terminate in a plane below the top of the sleeve 6, and each is connected to, or in communication with a tube 24, leading to a bearing or part to be lubricated. Mounted in the open upper end of each tube 21 is a U-shaped wire wrapped, except at its ends, with cotton or other absorbent material which conducts the oil from the cup, to the interior of the tubes 21, and discharges it into said tubes in the form of drops. The absorbent covering of the wire approximately fills the tube so as to limit the supply of oil fed to the pipes 24, to that which is taken up by the wire and its absorbent covering, and discharges from the lower end, into the tubes 21, and this is true even if the oil in the cup 4 should stand in a plane above the top of the tubes 21. By this method of feeding the oil, assisted by a free influx of air to the oil cup, the feed is constant and steady, and can by experiment, be regulated to supply the proper amount to the bearings. The lubricator can be attached to the machine or apparatus to be lubricated, or to any other convenient elevated support by means of the screws 25, or in any other suitable manner.

With this device sufficient oil can be supplied to the cup 4 for a known period of time, and by giving proper attention to such supply, the feed can be so regulated that there will be no appreciable loss of lubricant while the machine or apparatus is idle.

It is evident that many slight changes might be resorted to in the relative arrangement of parts shown and described without departing from the spirit and scope of my invention. Hence I would have it understood that I do not wish to confine myself to the exact construction and arrangement of parts shown and described, but,—

Having fully described my invention what I claim as new and desire to secure by Letters-Patent, is:

1. The combination of a reservoir, an oil cup below the same, a measuring chamber connecting the reservoir and oil cup, a rod, two disk valves rigid on said rod, one of said valves being within the oil cup and adapted to normally rest against the lower end of the measuring chamber for shutting off the supply of oil to the cup, and the other valve located in the reservoir and adapted when lowered to rest on the top of the measuring chamber for closing communication between the latter and the reservoir, a spring for normally holding said valves in their elevated positions, and manually operated means for lowering both valves.

2. The combination of a reservoir, an oil cup below same, a measuring chamber connecting the reservoir and oil cup, a hollow rod passing through the measuring chamber, and terminating in the oil cup for supplying air to the latter, two disk valves rigid on said rod, one within the oil cup and adapted to normally rest against the lower end of the measuring chamber for shutting off the supply of oil to the cup, and the other valve located in the reservoir and adapted when lowered to rest on the top of the measuring chamber for closing communication between the latter and the reservoir, a spring for normally holding said valves in their elevated positions, and manually operated means for lowering both valves.

3. The combination of a reservoir, an oil cup, a measuring chamber connecting the reservoir and cup, a hollow rod passing through the reservoir and measuring chamber, and terminating within the cup for supplying air continuously into the latter, disk valves secured to said rod, one valve adapted to close the lower end of the measuring chamber and the other adapted to be moved to close the upper end of said chamber, and means for actuating said hollow rod to close the upper end of the measuring chamber and open the lower end thereof.

4. The combination of a reservoir, an oil cup below and in communication with same, the oil cup being provided with a central compartment open at its top, an air tube passing through the reservoir and terminating within said compartment, a valve for closing communication between the reservoir and cup, a spring for normally holding said valve in its closed position and manually actuated means for moving said valve.

5. The combination of a reservoir, an oil cub below and in communication with same, and provided with a centrally located compartment open at its top, an air tube passing through the reservoir and terminating within said compartment, a disk valve on said tube for closing the opening into the cup from the reservoir, the said valve being located over the open upper end of said central compartment for preventing the entrance of oil into same, means for moving the rod to open the valve, and a spring for holding the rod in its elevated position.

6. The combination of a reservoir, measuring chamber, and cup, the latter having a central compartment open at the top only, a hollow rod passing through the reservoir and chamber and terminating within the compartment in the cup, two valves on said rod, one for closing the upper end of the measuring chamber and the other for closing the lower end of same, a spring for holding said rod and its valves normally elevated, and a lever engaging the upper end of the rod for depressing same, whereby the top valve will be moved to its closed position and the lower one moved to its open position, the said lower valve being over the central compartment in the cup for preventing the entrance of oil into the latter.

7. The combination of a reservoir, an oil cup below and in communication with same, the oil cup being provided with a central compartment open at the top, and closed at its bottom and sides, a rod passing through the reservoir and terminating in said compartment, a spring within said compartment for yieldingly holding the rod elevated, a valve on said rod for normally closing communication between the reservoir and cup, and manually actuated means for moving the rod, whereby the valve will be moved to open communication from the reservoir to the cup.

In testimony whereof, I have signed this specification in the presence of two subscribing witnesses.

FREMONT DOYLE.

Witnesses:
 A. B. CAINE,
 B. L. FRENCH.